United States Patent
Markiewicz

(10) Patent No.: US 10,776,344 B2
(45) Date of Patent: Sep. 15, 2020

(54) INDEX MANAGEMENT IN A MULTI-PROCESS ENVIRONMENT

(71) Applicant: Microsoft Technology Licensing, LLC, Redmond, WA (US)

(72) Inventor: Marcus Eduardo Markiewicz, Teaneck, NJ (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 239 days.

(21) Appl. No.: 15/923,193

(22) Filed: Mar. 16, 2018

(65) Prior Publication Data

US 2019/0286728 A1    Sep. 19, 2019

(51) Int. Cl.
| | | |
|---|---|---|
| *G06F 16/20* | (2019.01) | |
| *G06F 16/23* | (2019.01) | |
| *G06F 16/22* | (2019.01) | |
| *G06F 16/176* | (2019.01) | |
| *G06F 16/27* | (2019.01) | |
| *G06F 16/18* | (2019.01) | |

(52) U.S. Cl.
CPC ........ *G06F 16/2379* (2019.01); *G06F 16/176* (2019.01); *G06F 16/1815* (2019.01); *G06F 16/2228* (2019.01); *G06F 16/2365* (2019.01); *G06F 16/273* (2019.01)

(58) Field of Classification Search
None
See application file for complete search history.

(56) References Cited

U.S. PATENT DOCUMENTS

| | | | |
|---|---|---|---|
| 5,796,999 A | 8/1998 | Azagury et al. | |
| 6,341,285 B1* | 1/2002 | Blott | G06F 16/2322 |
| 2005/0038810 A1* | 2/2005 | Brodersen | G06F 16/278 |

OTHER PUBLICATIONS

"ACID (computer science)", Retrieved From: https://en.wikipedia.org/wiki/ACID_(computer science), Retrieved on: Nov. 1, 2018, 5 Pages.
"Serializability", Retrieved From: https://en.wikipedia.org/wiki/Serializability, Retrieved on: Nov. 1, 2018, 8 Pages.
"Readers—writer lock", Retrieved From: https://en.wikipedia.org/wiki/Readers%E2%80%93writer_lock, Retrieved on: Nov. 1, 2018, 4 Pages.

(Continued)

*Primary Examiner* — Belix M Ortiz Ditren
(74) *Attorney, Agent, or Firm* — Michael Best & Friedrich LLP

(57) ABSTRACT

Systems and methods for managing an index shared by a plurality of processes. One method includes reading, with a process, the index at a first state and maintaining a journal of operations to be performed on the index at the first state by the process. Each operation included in the journal includes a create operation or a delete operation. The method also includes, in response to a predetermined event, applying the journal of the one of the plurality of processes to update the index. Applying the journal includes deleting an existing entry from the index and adding a new entry to the index for each create operation included in the journal specifying a key included in an entry of the index at the second state, and ignoring each delete operation included in the journal specifying a key not included in an entry of the index at the second state.

20 Claims, 3 Drawing Sheets

(56) References Cited

OTHER PUBLICATIONS

"Storage Engine—Do Databases make a Delete and an Insert When Having to Update Rows?—Database Administrators Stack Exchange", Retrieved from: https://web.archive.org/web/20160608170200/https://dba.stackexchange.com/questions/137432/do-databases-make-a-delete-and-an-insert-when-having-to-update-rows, Jun. 8, 2016, 1 Page.

"International Search Report and Written Opinion Issued in PCT Application No. PCT/US2019/021510", dated Jun. 6, 2019, 13 Pages.

* cited by examiner

INDEX MANAGEMENT IN A MULTI-PROCESS ENVIRONMENT

FIELD

Embodiments described herein relate to managing an index shared by a plurality of processes.

SUMMARY

Software processes access data stored in a storage medium, such as files in a file system. To access this data quickly and efficiently, a global index may be created that maps unique keys to stored data. For example, in systems where there is a portioning of work across multiple concurrently running processes, indices are often created to find partitioned data sets. For example, in a system where processes manage siloed data, a global index may be created to maintain what data is available on the system for proper routing and consistent management of data.

One challenge in managing such an index is how to maintain the global index with a plurality of processes accessing the index with minimal latency and locking impact while maintaining atomicity, consistency, isolation, and durability (ACID) guarantees of the global index. Accordingly, embodiments described herein address this and other technical problems using a multi-process journaling index.

For example, one embodiment provides a system for managing an index shared by a plurality of processes. The system includes at least one electronic processor configured to execute the plurality of processes. The at least one electronic processor is configured to maintain, for each of the plurality of processes, a journal of operations to be performed on the index at a first state by each of the plurality of processes. Each entry in the index including a key and an associated value and each operation included in a journal for one of the plurality of processes including a create operation or a delete operation and each operation specifying a key. The at least one electronic processor is also configured to, in response to a predetermined event, apply the journal of the one of the plurality of processes to update the index. Applying the journal includes (a) reading, with the one of the plurality of processes, the index at a second state, (b) deleting an existing entry from the index for each delete operation included in the journal specifying a key included an entry of the index at the second state, (c) adding a new entry to the index for each create operation included in the journal specifying a key not included in an entry of the index at the second state, (d) deleting an existing entry from the index and adding a new entry to the index for each create operation included in the journal specifying a key included in an entry of the index at the second state, and (e) ignoring each delete operation included in the journal specifying a key not included in an entry of the index at the second state.

Another embodiment provides a method for managing an index shared by a plurality of processes executed by at least one electronic processor. The method includes reading, with the at least one electronic processor for one of the plurality of processes, the index at a first state, wherein each entry in the index including a key and an associated value, and maintaining, with the at least one electronic processor, a journal of operations to be performed on the index at the first state by the one of the plurality of processes. Each operation included in the journal including a create operation or a delete operation and each operation specifying a key. The method also includes, in response to a predetermined event, applying, with the at least one electronic processor, the journal of the one of the plurality of processes to update the index. Applying the journal includes (a) reading, with the one of the plurality of processes, the index at a second state, (b) deleting an existing entry from the index for each delete operation included in the journal specifying a key included an entry of the index at the second state, (c) adding a new entry to the index for each create operation included in the journal specifying a key not included in an entry of the index at the second state, (d) deleting an existing entry from the index and adding a new entry to the index for each create operation included in the journal specifying a key included in an entry of the index at the second state, and (e) ignoring each delete operation included in the journal specifying a key not included in an entry of the index at the second state.

Yet another embodiment provides a non-transitory computer-readable medium storing instructions executable by at least one electronic processor to perform a set of functions. The set of functions including reading, with one of a plurality of processes, an index at a first state, wherein each entry in the index including a key and an associated value and the index shared among the plurality of processes. The set of functions also including maintaining, with the one of the plurality of processes, a journal of operations to be performed on the index at the first state by the one of the plurality of processes, wherein each operation included in the journal including a create operation or a delete operation and each operation specifying a key, and, in response to a predetermined event, applying the journal of the one of the plurality of processes to update the index. Applying the journal includes (a) reading, with the one of the plurality of processes, the index at a second state, (b) deleting an existing entry from the index for each delete operation included in the journal specifying a key included an entry of the index at the second state, (c) adding a new entry to the index for each create operation included in the journal specifying a key not included in an entry of the index at the second state, (d) deleting an existing entry from the index and adding a new entry to the index for each create operation included in the journal specifying a key included in an entry of the index at the second state, and (e) ignoring each delete operation included in the journal specifying a key not included in an entry of the index at the second state.

DETAILED DESCRIPTION

Figure 1:
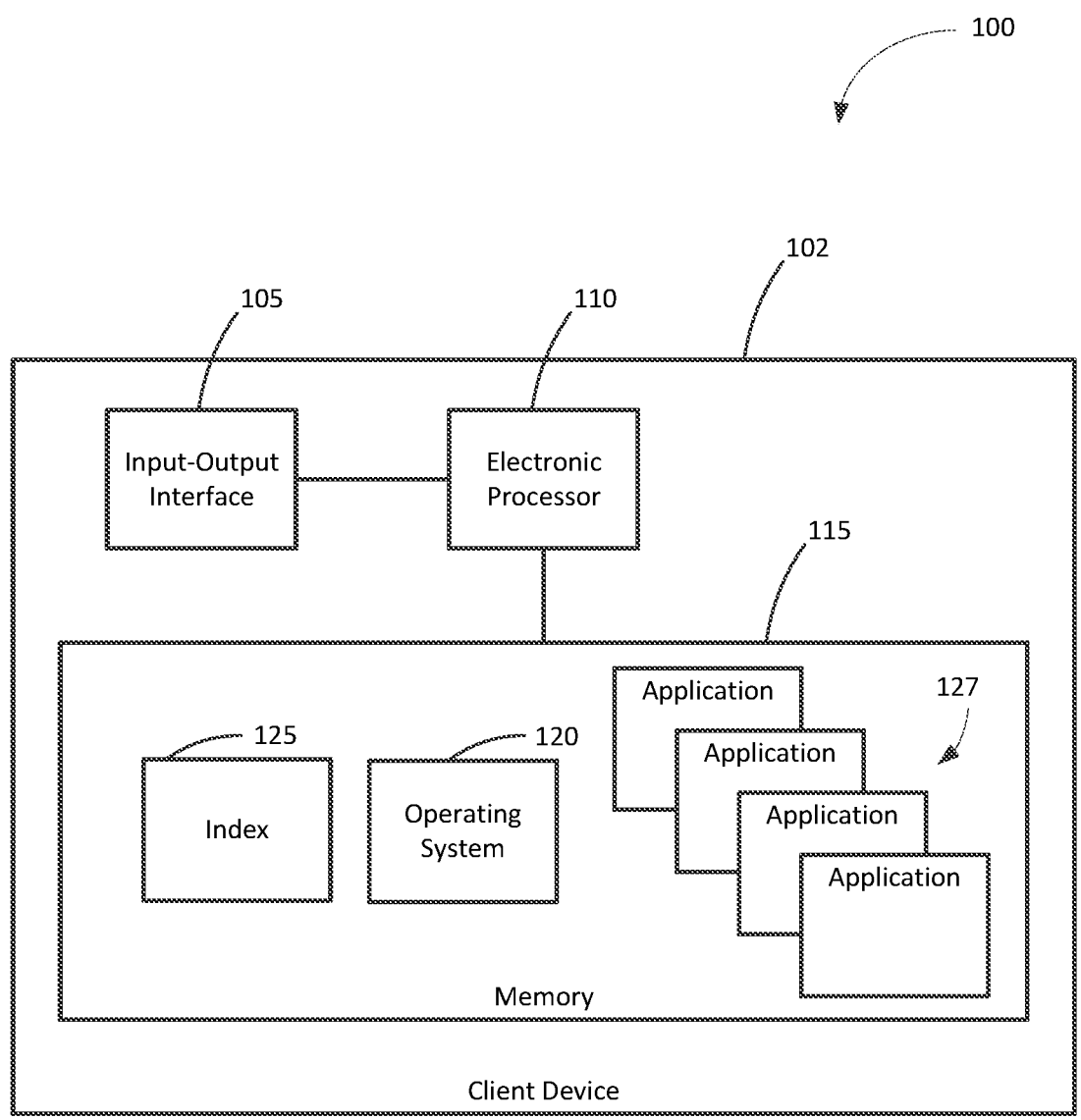
FIG. 1 schematically illustrates a system including a plurality of currently running processes according to one embodiment.

One or more embodiments are described and illustrated in the following description and accompanying drawings. These embodiments are not limited to the specific details provided herein and may be modified in various ways. Furthermore, other embodiments may exist that are not described herein. Also, the functionality described herein as being performed by one component may be performed by multiple components in a distributed manner. Likewise, functionality performed by multiple components may be consolidated and performed by a single component. Similarly, a component described as performing particular functionality may also perform additional functionality not described herein. For example, a device or structure that is "configured" in a certain way is configured in at least that way, but may also be configured in ways that are not listed. Furthermore, some embodiments described herein may include one or more electronic processors configured to perform the described functionality by executing instructions stored in non-transitory, computer-readable medium. Similarly, embodiments described herein may be implemented as non-transitory, computer-readable medium storing instructions executable by one or more electronic processors to perform the described functionality. As used in the present application, "non-transitory computer-readable medium" comprises all computer-readable media but does not consist of a transitory, propagating signal. Accordingly, non-transitory computer-readable medium may include, for example, a hard disk, a CD-ROM, an optical storage device, a magnetic storage device, a ROM (Read Only Memory), a RAM (Random Access Memory), register memory, a processor cache, or any combination thereof.

In addition, the phraseology and terminology used herein is for the purpose of description and should not be regarded as limiting. For example, the use of "including," "containing," "comprising," "having," and variations thereof herein is meant to encompass the items listed thereafter and equivalents thereof as well as additional items. The terms "connected" and "coupled" are used broadly and encompass both direct and indirect connecting and coupling. Further, "connected" and "coupled" are not restricted to physical or mechanical connections or couplings and can include electrical connections or couplings, whether direct or indirect. In addition, electronic communications and notifications may be performed using wired connections, wireless connections, or a combination thereof and may be transmitted directly or through one or more intermediary devices over various types of networks, communication channels, and connections. Moreover, relational terms such as first and second, top and bottom, and the like may be used herein solely to distinguish one entity or action from another entity or action without necessarily requiring or implying any actual such relationship or order between such entities or actions.

As described above, indices may be generated to manage access to stored data among a plurality of processes. For example, a client device may access data via a cloud service and a local copy of the accessed data may be stored on the client device. Multiple processes executed by the client device may need access to the local copies and may each access the data through a global index. Although the global index provides fast access to the locally-stored data, access and manipulation of the global index must be managed to prevent conflicts and delays.

Generally, these problems are solved by locking all access to the global index across all processes or re-trying transactions when conflicts occur. Both of these solutions are problematic performance-wise due to increased input/output usage and processing usage. These solutions can also lead to bugs due to unexpected re-trying of transactions and the business logic associated with such re-trying.

Accordingly, the systems and methods described herein provide a multi-process journaling index wherein each process maintains a journal of activities performed relative to a global index. Periodically, the journal is applied to global index. Thus, the multi-process journaling index resolves conflicts across access to the global index and supports not-in-place indices, which is solid state storage (drive or disk) (SSD) friendly.

For example, FIG. 1 schematically illustrates a system 100 including a plurality of concurrently running processes. As illustrated in FIG. 1, the system 100 includes a client device 102. The client device 102 is a computing device such as, for example, a desktop computer, laptop computer, a tablet, a smart phone, a smart wearable, a smart television, or the like.

The client device 102 includes an input-output interface 105, an electronic processor 110, and a memory 115. The input-output interface 105, the electronic processor 110, and the memory 115 communicate wirelessly, over wired communication channels or a bus, or a combination thereof. It should be understood that the client device 102 may include additional components than those illustrated in FIG. 1 in various configurations. For example, in some embodiments, the client device 102 includes multiple electronic processors, multiple memory modules, multiple input-output interfaces 105, and the like.

The input-output interface 105 allows the client device 102 to communicate with communication networks, peripheral devices, and the like. For example, the input-output interface 105 may include Ethernet ports, universal serial bus (USB) ports, and other communication ports. The electronic processor 110 may be a microprocessor, an application-specific integrated circuit (ASIC), and the like. The electronic processor 110 is generally configured to execute software instructions to perform a set of functions, including the functions described herein. The memory 115 includes a non-transitory computer-readable medium and stores data, including instructions that are executable by the electronic processor 110. For example, as illustrated in FIG. 1, the memory 115 stores an operating system 120. The operating system 120 is executed by the electronic processor 110 to manage resources of the client device 102, including managing access to locally stored data, including data stored in the memory 115 and other memory modules of the client device 102.

For example, as described above, the operating system 120 may be configured to generate an index for data, such as partitioned data sets, stored in the memory 115, other memory modules of the client device 102, or a combination thereof. As illustrated in FIG. 1, the index 125 may store unique keys (pointers) to stored data, metadata regarding stored data, and the like. In some embodiments, each entry in the index 125 is a primary key. Also, in embodiments where multiple indices are created, each index may be serialized into a separate file in the file system. This separation allows for independent operations per index without impacting other indices.

Accordingly, as described above, the index 125 allows processes (executed by the electronic processor 110) to quickly find data, such as partitioned data sets stored on the client device 102. For example, in addition to the operating system 120, the client device 102 may store one or more software applications (referred to herein as applications 127) executable by the electronic processor 110. The applications 127 may include a productivity application (such as a word processing application, a slide presentation application, or the like), a gaming application, a media application, a browser application, or the like. Each instance of these applications 127 executed by the electronic processor 110 is a process, and the electronic processor 110 supports concurrently running processes, wherein the processes may include multiple instances of the same application 127, instances of different applications 127, or a combination thereof.

Figure 2:
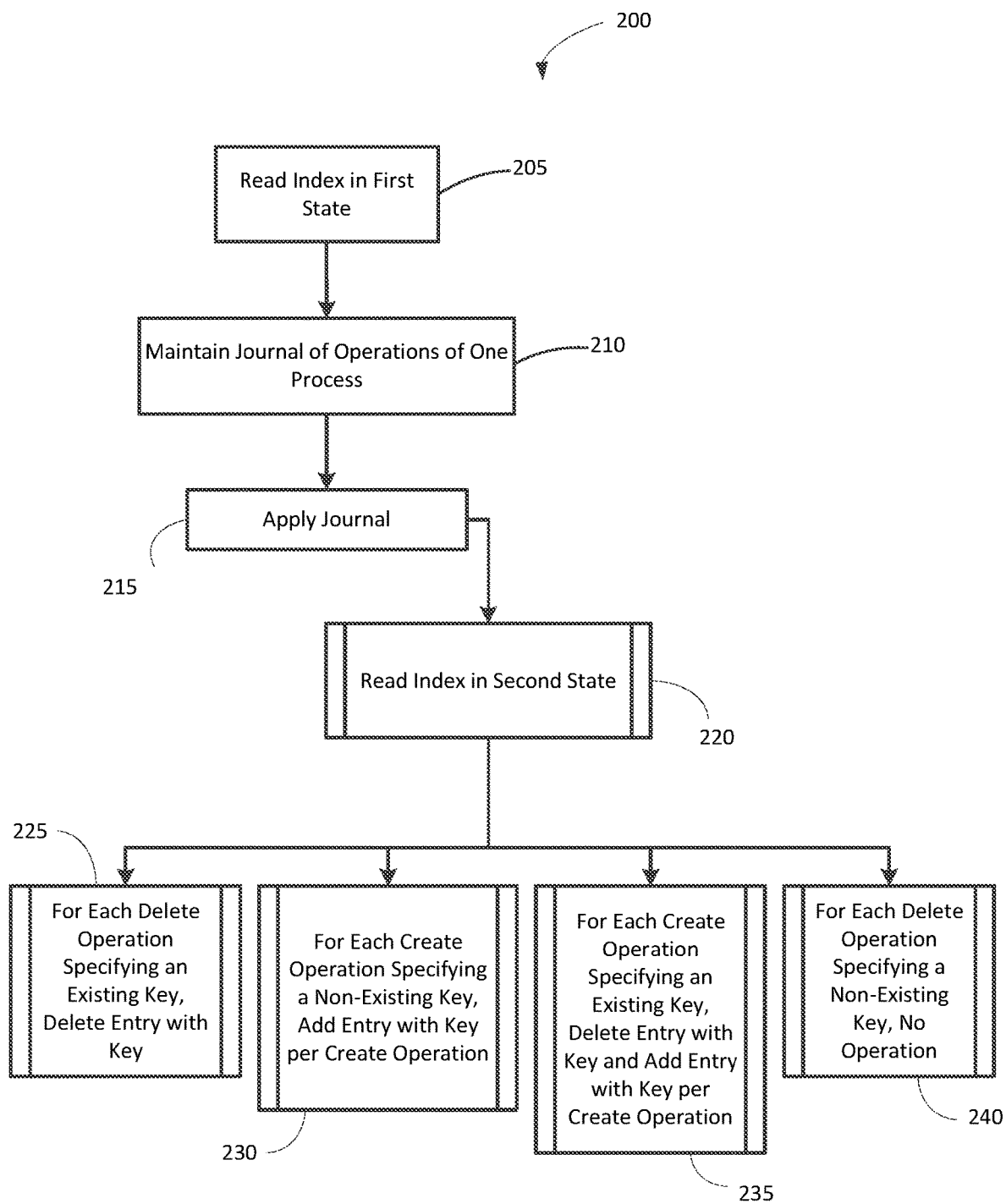
FIG. 2 is a flowchart illustrating a method for managing an index shared by the plurality of processes of the system of FIG. 1 according to one embodiment.

As also described above, the index 125 must be managed to ensure data integrity while limiting delays. FIG. 2 is a flowchart illustrating a method 200 for managing the index 125 among a plurality of concurrently running processes on the client device 102 according to one embodiment. The method 200 is described as being performed by a process running on the client device 102 (as executed by the electronic processor 110). However, it should be understood that the method 200 or portions thereof may be performed by more than one process, the operating system 120, or a combination thereof. For example, in some embodiments, the method 200 is performed by the operating system 120 as part of the file input/output (IO) stack.

As illustrated in FIG. 2, the method 200 includes reading, with one of the plurality of processes, the index 125 at a first state (at block 205). As described above, each entry in the index 125 includes a key and an associated value. The process reading the index 125 stores a copy of the index 125 that the process uses to access data. The process also maintains a journal of operations (changes) performed by the process on the index 125 from the first state (the last read) (at block 210). Operations performed by a process with respect to the index 125 are limited to read operations, create operations, and delete operations. No update operations are allowed. Accordingly, any update to the index 125 is represented in the journal as a delete operation (to delete the existing entry to be updated) and a subsequent create operation (to add a new entry with the updated entry). Each delete operation stored in the journal specifies a key for an index entry and each create operation stored in the journal specifies a key for an index entry and an associated value for the entry.

In response to a predetermined event, the process applies the journal to the index 125 to update the index 125 (at block 215). The predetermined event may be a predetermined frequency, such as every 100 milliseconds. It should be understood that varying frequencies may be used to apply journals to the index 125 to manage both data integrity and resource usage. Alternatively or in addition, the predetermined event may be an operation by a process, such as the closing or termination of a process.

Since the index 125 may have changed from the last time the process read the index 125, the process may experience a conflict when applying the journal to the index. For example, as illustrated in FIG. 2, applying the journal to the index includes reading the current state of the index 125 (a second state) (at block 220) and sequentially (time-wise) applying the journaled operations to the current state of the index. In particular, when the journal includes a delete operation for an entry that exists in the current state of the index 125 (the delete operation specifies a key included in the current state of the index 125), the process deletes the existing entry from the current state of the index 125 (at block 225). Similarly, when the journal includes a create operation for an entry that does not exist in the current state of the index 125 (the create operation specifies a key not included in the current state of the index 125), the process adds a new entry to the index 125 as specified by the journal (at block 230).

However, when the journal includes a create operation for a new entry that already exists in the current state of the index 125 (the create operation specifies a key that exists in the current state of the index 125), the process deletes the existing entry from the index 125 and adds a new entry to the index 125 as specified by the journal (at block 235). Also, when the journal includes a delete operation for an entry that does not exist in the current state of the index 125 (the delete operation specifies a key that does not exist in the current state of the index 125), the process ignores the delete operation included in the journal.

In some embodiments, when updating an index, there is no requirement for in-place alteration of indices. Therefore, updates to an index may be implemented using full re-writes of an index (which tend to be more SSD friendly and are naturally atomic) or in-place changes (which tend to be more friendly to rotational media). Also, each process that has interest in a particular index's data may be interested in changes to the index. Accordingly, in some embodiments, an operating system event may be used to indicate changes made to an index. Any process listening for such an event can reload (re-read) the index and update its state accordingly if needed.

Figure 3:
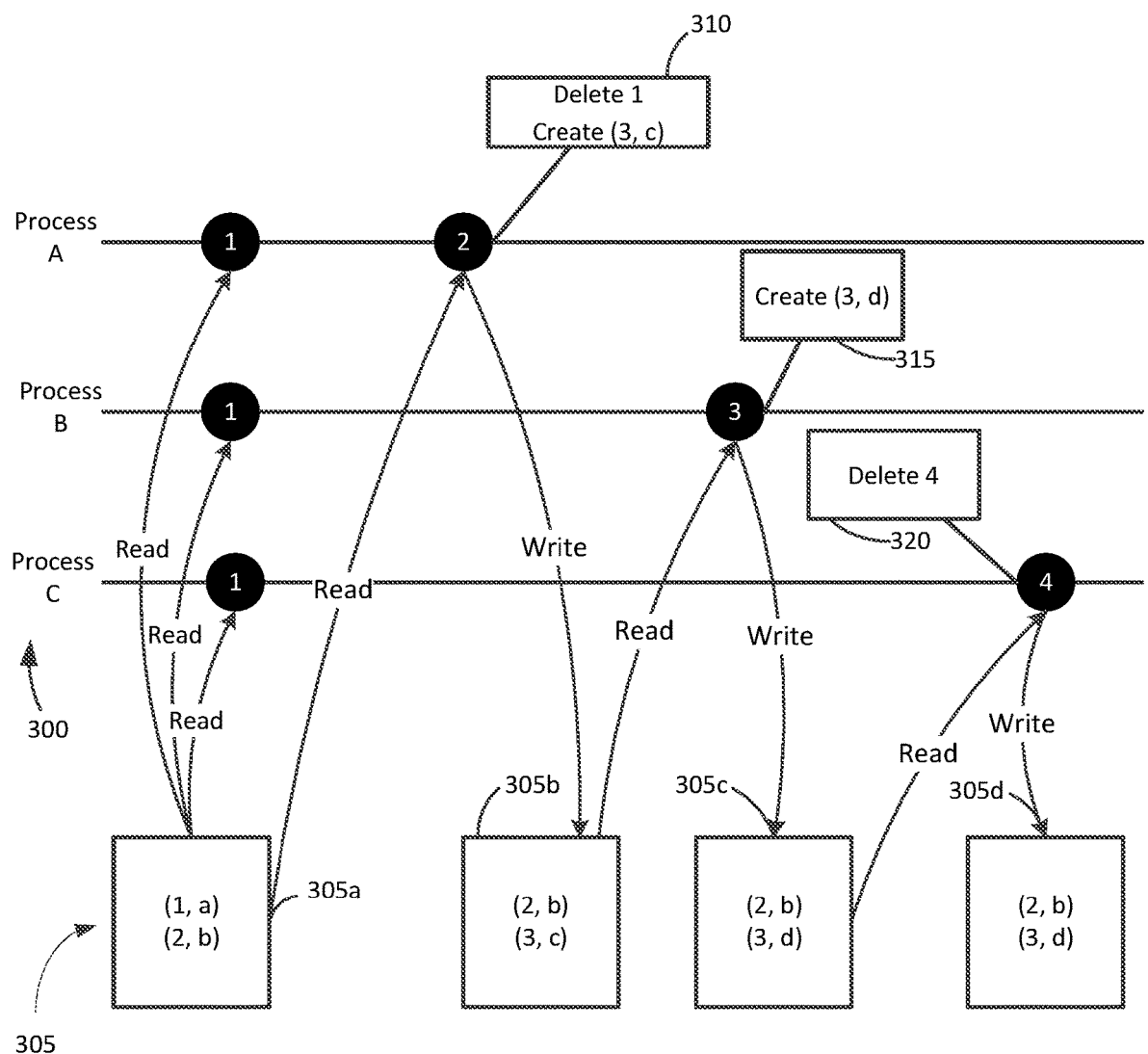
FIG. 3 illustrates an example of a plurality of processes accessing an index using the method of FIG. 2 according to one embodiment.

FIG. 3 illustrates an example of using the method 200 to manage a plurality of processes 300 (including Process A, Process B, and Process C) using an index 305. As illustrated in FIG. 3, the index 305 includes at least one entry and each entry includes a key (for example, a unique numerical identifier) and an associated value (for example, a text string, a pointer, a numerical value, or the like). As illustrated in FIG. 3, in a first state 305a, the index 305 includes a first entry (1, a) and a second entry (2, b). In a second state 305b, the index 305 includes the second entry (2, b) and a third entry (3, c). In a third state 305c, the index 305 includes the second entry (2, b) and a fourth entry (3, d). In a fourth state 305d, the index 305 includes the second entry (2, b) and the fourth entry (3, d).

As described above, each process in the multi-process environment that has an interest in the index 305 reads the current state of the index 305 and uses the read version of the index 305 to access data as needed. Also, as each process changes the index 305, the process maintains a journal of such changes as either a create operation, a delete operation, or a combination thereof. As described above, instead of immediately applying changes to the index 305, the journal allows a process to track changes the process will make to the index 305, which allows other processes to more freely read and access the index 305. In other words, by using the journal, a process does not make in-place alterations of the index 305 but rather applies the journal to the index 305 in response to predetermined events, which can be configured to balance data integrity with resource usage. Accordingly, each journal is a delta of the index 305 until the journal is applied.

For example, FIG. 3 illustrates a journal 310 associated with Process A tracking changes to the index 305 made by Process A as of the first state of the index 305 (the last read of the index 305 performed by the Process A). The journal 310 includes a delete operation specifying a key of "1" and a create operation specifying a key of "3" and an associated value of "c." As illustrated in FIG. 3, each delete operation added to a journal specifies a key for an entry in the index 305 and each create operation added to a journal specifies a key and an associated value for an entry in the index 305. As noted above, no update operations are allowed. Thus, any update to the index 305 performed by a process is tracked in the journal as a delete operation and a create operation.

When the predetermined event occurs, the Process A applies the journal 310 to the current state of the index 305 to commit the changes to the index 305 made by Process A. In particular, the Process A reads the current state of the index 305 (the second state) and sequentially applies each operation included in the journal 310 to the current state of the index 305. Thus, the Processor A deletes the existing entry in the current state of the index 305 with the key of "1" and adds a new entry to the current state of the index 305 with a key of "3" and an associated value of the "c." In some embodiments, after applying the journal to the current state of the index 305, the Processor A starts a new journal to track operations to the new current state of the index 305.

As illustrated in FIG. 3, the Process B also maintains a journal 315, which includes a create operating specifying a key of "3" and an associated value of "d." When the Process B applies the journal 315 to the current state of the index 305, the index 305 has changed (based on the changes made by Process A) since the Process B read the index 305 and, thus, a conflict exists. For example, the journal 315 includes a create operation specifying a key of "3" and an associated value of "d," but the current state of the index 305 (a third state) already includes an entry with a key of "3." Thus, when applying this create operation to the current state of the index 305, the Process B deletes the existing entry from the index 305 with the key of "3" and adds a new entry to the index 305 with a key of "3" and an associated value of "d" as specified by the journal 315.

Similarly, when Process C attempts to apply the journal 320 to the current state of the index 305 (a fourth state), the current state of the index 305 no longer includes an entry with a key of "4." Thus, the Process C ignores the delete operation (converts to a no operation (NOP)) included in the journal 320 that specifies the key of "4."

Accordingly, not only do the per-process journals allows processes to track updates to the index 125 without have to wait for access to the index to apply the change, but by limiting the operations to delete and create operations and applying the above conflict logic, multiple processes can use an index efficiently and accurately.

In a multi-process environment, access to the index 125 (to read, write, or both) may be limited to one process at a time. Accordingly, the index 125 may be locked to all other processes whenever a process is reading or writing to the index 125. However, to further reduce delays in gaining access to the index 125, the operating system 120 may separate read-only operations from read-write operations with read-write locking semantics to provide view-serialization and associated consistent results of operations to the index 125.

For example, the operating system 120 may be configured generate one or more mutexes for the index 125. A mutex (also referred to as a mutual exclusion object) is an object that controls access to data by processes, such as limiting access to the data by no more than one process at a time. Accordingly, a mutex maintains data integrity by allowing only one process to access data at a time. Therefore, a process cannot access data that is being changed or used by another process until the other process is done, which preserves data integrity.

In some embodiments, the operating system 120 generates a read mutex and a write mutex for the index 125 to provide concurrent access by two or more processes to the index 125 for read purposes (to limit busy-waits for read operations) while imposing reliable waits for write operations. For example, the read mutex controls access to the index for read purposes, and the write mutex controls access to the index for write purposes. In some embodiments, any number of processes may concurrently access the index 125 through the read mutex. For example, when a process wants to access the index 125, the read mutex may increment a counter that indicates a number of processes currently reading the data and the decrement the counter once the process has finished reading the data to track a number of processes currently reading the index. The write mutex may use this counter to determine when a write to the index 125 should be allowed. In other words, while a process is still reading the index 125 via the read mutex, the write mutex may prevent any other process from writing to the index 125.

The write mutex allows a process to write (change) the index 125. For example, when process needs to change data associated with a key included in the index 125, such as to apply a journal, the process accesses the index 125 via the write mutex and updates the index 125 accordingly. While the process is writing to the index 125, another process is locked out of writing to the index 125. Accordingly, a process may experience delays when attempting to write to the index 125 when another process is reading or writing to the index 125. However, as noted above, separating read-only requests from read-write requests through the use of the mutexes reduces overall delays for accessing the index 125

Thus, embodiments described herein provide methods and systems for managing an index shared between multiple processes through journaling for each process a delta on the existing index until the journal is applied. The use of the journals describing changes to an index allows conflicts to be scoped down to actual modifications of the index (as compare to general write or read conflicts). It should be understood that the methods and systems described herein are not limited to multi-process environments on a single computing device but may be used manage an index used by multiple processes executed on a plurality of computing devices, including, for example, computing devices operating within a cloud computing environment or the like. Similarly, the methods and systems described herein may be used at a process level, a thread level, or a combination thereof.

Various features and advantages of some embodiments are set forth in the following claims.

What is claimed is:

1. A system for managing an index shared by a plurality of processes, the system comprising:
at least one electronic processor configured to execute the plurality of processes, wherein the at least one electronic processor is configured to:
maintain, for each of the plurality of processes, a journal of operations to be performed on the index at a first state by each of the plurality of processes, each entry in the index including a key and an associated value and each operation included in a journal for one of the plurality of processes including a create operation or a delete operation and each operation specifying a key;
in response to a predetermined event, apply the journal of the one of the plurality of processes to update the index, wherein applying the journal includes:
reading, with the one of the plurality of processes, the index at a second state,
deleting an existing entry from the index for each delete operation included in the journal specifying a key included an entry of the index at the second state,
adding a new entry to the index for each create operation included in the journal specifying a key not included in an entry of the index at the second state,
deleting an existing entry from the index and adding a new entry to the index for each create operation included in the journal specifying a key included in an entry of the index at the second state, and ignoring each delete operation included in the journal specifying a key not included in an entry of the index at the second state.

2. The system of claim 1, wherein the at least one electronic processor is configured to maintain the journal of operations for each of the plurality of processes by representing any update operation to the index as a delete operation and a subsequent create operation.

3. The system of claim 1, wherein the at least one electronic processor is configured to read the index at the first state via a mutex.

4. The system of claim 1, wherein the at least one electronic processor is configured to read the index at the first state via a read mutex and is configured to read the index at the second state via a write mutex separate from the read mutex.

5. A method of managing an index shared by a plurality of processes executed by at least one electronic processor, the method comprising:
reading, with the at least one electronic processor for one of the plurality of processes, the index at a first state, each entry in the index including a key and an associated value;
maintaining, with the at least one electronic processor, a journal of operations to be performed on the index at the first state by the one of the plurality of processes, each operation included in the journal including a create operation or a delete operation and each operation specifying a key; and
in response to a predetermined event, applying, with the at least one electronic processor, the journal of the one of the plurality of processes to update the index, wherein applying the journal includes:
reading, with the one of the plurality of processes, the index at a second state,
deleting an existing entry from the index for each delete operation included in the journal specifying a key included an entry of the index at the second state;
adding a new entry to the index for each create operation included in the journal specifying a key not included in an entry of the index at the second state;
deleting an existing entry from the index and adding a new entry to the index for each create operation included in the journal specifying a key included in an entry of the index at the second state; and
ignoring each delete operation included in the journal specifying a key not included in an entry of the index at the second state.

6. The method of claim 5, wherein maintaining the journal of operations includes representing any update operation to the index as a delete operation and a subsequent create operation.

7. The method of claim 5, wherein applying the journal to update the index in response to the predetermined event includes applying the journal to update the index at a predetermined frequency.

8. The method of claim 5, wherein applying the journal to update the index in response to the predetermined event includes applying the journal to update the index in response to termination of the one of the plurality of processes.

9. The method of claim 5, wherein reading the index at the first state includes reading the index concurrently with a second one of the plurality of processes reading the index at the first state.

10. The method of claim 5, wherein reading the index at the first state includes reading the index at the first state via a mutex.

11. The method of claim 5, wherein reading the index at the first state includes reading the index at the first state via a read mutex and wherein reading the index at a second state includes reading the index at the second state via a write mutex separate from the read mutex.

12. The method of claim 5, further comprising generating an event in response to applying the journal to update the index at the second state, the event informing listening processes to reload the index as updated.

13. A non-transitory medium storing instructions executable by at least one electronic processor to perform a set of functions, the set of functions comprising:
reading, with one of a plurality of processes, an index at a first state, each entry in the index including a key and an associated value and the index shared among the plurality of processes;
maintaining, with the one of the plurality of processes, a journal of operations to be performed on the index at the first state by the one of the plurality of processes, each operation included in the journal including a create operation or a delete operation and each operation specifying a key; and
in response to a predetermined event, applying the journal of the one of the plurality of processes to update the index, wherein applying the journal includes:
reading, with the one of the plurality of processes, the index at a second state,
deleting an existing entry from the index for each delete operation included in the journal specifying a key included an entry of the index at the second state;
adding a new entry to the index for each create operation included in the journal specifying a key not included in an entry of the index at the second state;
deleting an existing entry from the index and adding a new entry to the index for each create operation included in the journal specifying a key included in an entry of the index at the second state; and
ignoring each delete operation included in the journal specifying a key not included in an entry of the index at the second state.

14. The non-transitory computer-readable medium of claim 13, wherein maintaining the journal of operations includes representing any update operation to the index as a delete operation and a subsequent create operation.

15. The non-transitory computer-readable medium of claim 13, wherein applying the journal to update the index in response to the predetermined event includes applying the journal to update the index at a predetermined frequency.

16. The non-transitory computer-readable medium of claim 13, wherein applying the journal to update the index in response to the predetermined event includes applying the journal to update the index in response to termination of the one of the plurality of processes.

17. The non-transitory computer-readable medium of claim 13, wherein reading the index at the first state includes reading the index concurrently with a second one of the plurality of processes reading the index at the first state.

18. The non-transitory computer-readable medium of claim 13, wherein reading the index at the first state includes reading the index at the first state via a mutex.

19. The non-transitory computer-readable medium of claim 13, wherein reading the index at the first state includes reading the index at the first state via a read mutex and wherein reading the index at a second state includes reading the index at the second state via a write mutex separate from the read mutex.

20. The non-transitory computer-readable medium of claim 13, further comprising generating an event in response to applying the journal to update the index at the second state, the event informing listening processes to reload the index as updated.

\* \* \* \* \*